April 7, 1953   H. McALPINE ET AL   2,634,221
FILM WASHING PROCESS
Filed July 13, 1948   2 SHEETS—SHEET 1

INVENTORS
HERMAN FREDERICK HOERIG
and HARRY McALPINE
BY
ATTORNEY

April 7, 1953 H. McALPINE ET AL 2,634,221
FILM WASHING PROCESS
Filed July 13, 1948 2 SHEETS—SHEET 2
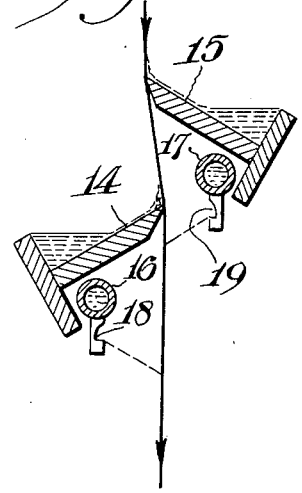
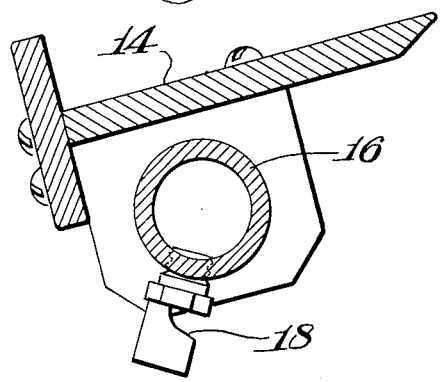
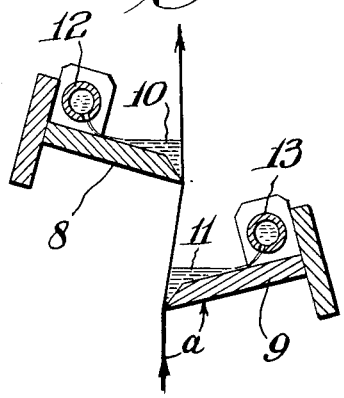
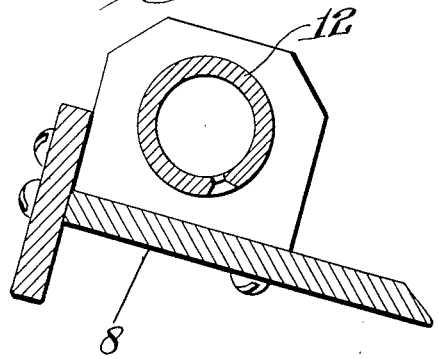
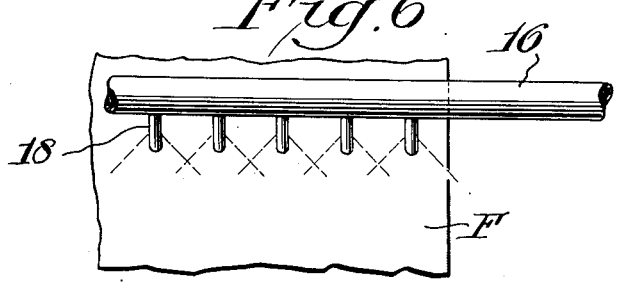
INVENTORS
HERMAN FREDERICK HOERIG
and HARRY McALPINE
BY
ATTORNEY Patented Apr. 7, 1953

2,634,221

UNITED STATES PATENT OFFICE 2,634,221

FILM WASHING PROCESS

Harry McAlpine, Buffalo, and Herman Frederick Hoerig, Grand Island, N. Y., assignors to E. I. du Pont de Nemours & Company, Wilmington, Del., a corporation of Delaware Application July 13, 1948, Serial No. 38,486

2 Claims. (Cl. 134—9)

This invention relates to the manufacture of film and more particularly to an improved method for washing continuous gel regenerated cellulose film.

The present method of washing gel regenerated cellulose film manufactured on standard casting machines consists of passing the film through numerous wash tanks which contain a large quantity of water. This method is not entirely satisfactory due to the development of film tension caused by water drag. Tension increases rapidly as film speed is increased, and since undue tension results in film having poor physical properties it is apparent that the present method of tank washing is not satisfactory for high speed casting of film.

It is well known that thin fluid films are set up at the interface between a moving solid and a fluid. When the gel film enters a wash water tank it has impurities associated with it from the previous treating bath which must be removed in the washing process. We have now determined that most of the impurities are in the fluid film which carries over on the gel film, while only a small proportion are actually inside of the gel film, and in the present method of washing gel regenerated cellulose film, the fluid film at the interface moves along with the regenerated cellulose film and is scarcely disturbed by the wash water so that the extraction of the soluble impurities associated with the regenerated cellulose film is largely dependent on the two-step diffusion of the solute from the regenerated cellulose film to the fluid film at the interface and from the fluid film to the wash water. This would appear to account for the relative slowness of the present multi-tank method of washing or extracting impurities from the gel film.

The primary object of this invention, therefore, is to provide a more rapid and efficient process for effecting removal of impurities from gel film, while avoiding the difficulties and disadvantages pointed out hereinabove.

Another object is to rapidly and effectively wash impurities from continuous gel regenerated cellulose film, while imposing a minimum tension on the film.

Still another object is to provide a method of washing continuous gel regenerated cellulose film which is characterized by rapidity in operation, and by simplicity, economy and a high degree of washing efficiency. These and other objects will more clearly appear hereinafter.

These objects are realized by the present invention which, briefly stated, comprises continuously applying a film of fresh wash water to a travelling web of gel film, containing soluble impurities, at a predetermined point in the travel of the gel film to effect dilution of the solution of impurities on or outside the surface of the gel film, and thereafter, at a predetermined point, removing the dilute aqueous film from the surface of the gel film, and repeating this sequence of operations at subsequent points in the travel of the web of gel film until the desired degree of impurity removal is attained.

The apparatus and arrangement thereof operative in accordance with the principles of this invention will now be described with reference to the accompanying drawing wherein:

Fig. 2 is a cross-sectional view of a combined wash and wash water-removal station, featuring a widge angle wash water spray, adapted for treating a vertically disposed, downwardly travelling web of gel film;

Fig. 3 is a cross-sectional view of a combined wash and wash water-removal station adapted for treating a vertically disposed, upwardly travelling web of gel film;

Figs. 4 and 5 are detailed views, partly in section, of the wash and wash water-removal apparatus of Figs. 2 and 3, respectively; and Fig. 6 is a plan view of the water header and associated wide angle spray nozzles illustrating the spray pattern obtained therewith.

Figure 1:
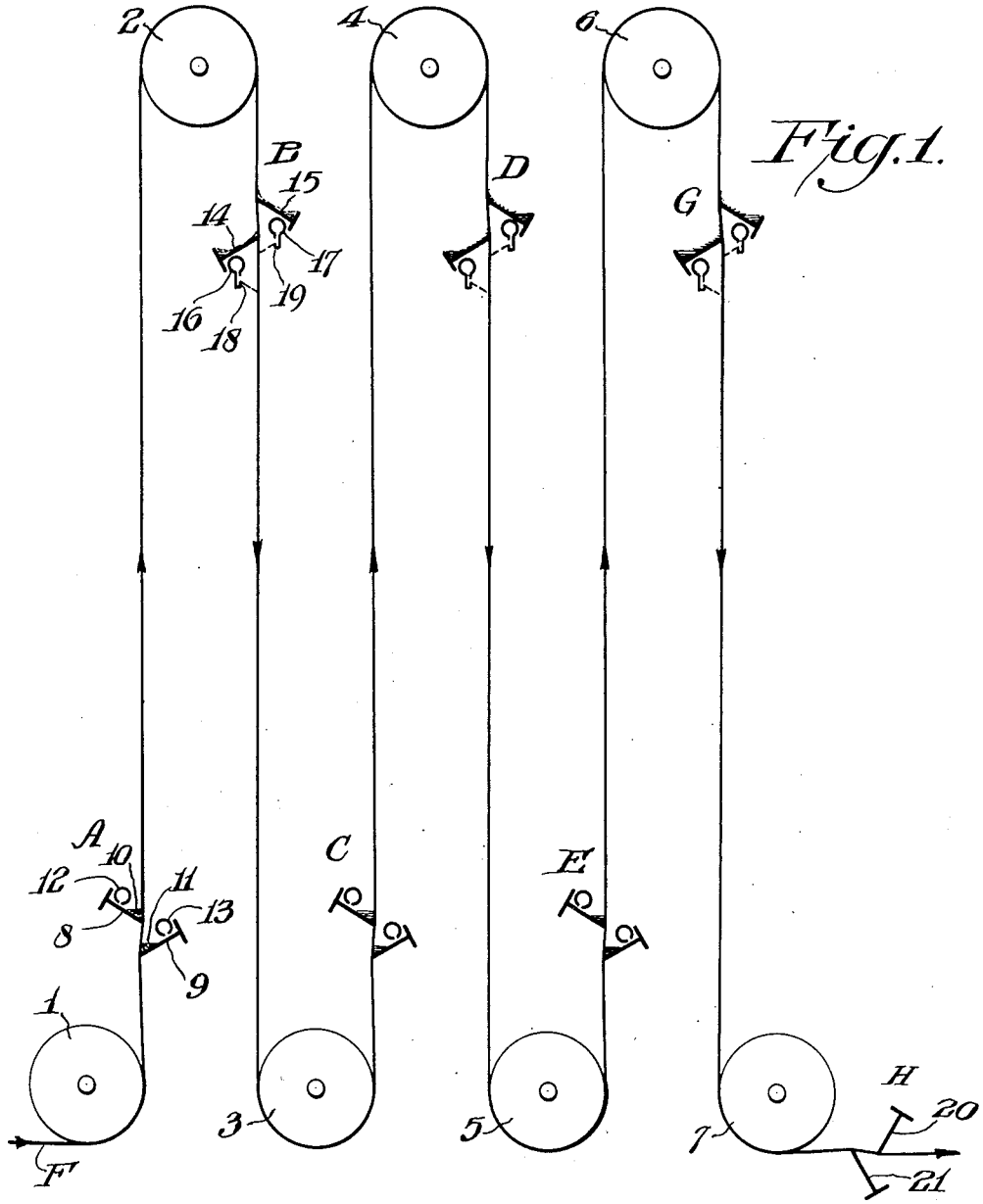
Fig. 1 is a diagrammatic illustration of a preferred embodiment comprising six wash and wash water-removal stations and a final wash water-removal station spaced along the path of travel of a web of gel film.

Referring to Fig. 1, a web of gel regenerated cellulose film F issuing from the conventional desulfuring bath (not shown) is passed over a series of parallel, freely rotatable lower rolls 1, 3, 5 and 7 and positively driven upper rolls 2, 4 and 6 disposed to carry the film in a substantially vertical, alternately ascending and descending, path of travel.

Liquid from the desulfuring bath adhering to the surface of the gel film is removed and a film of fresh wash water is applied to the gel film in its upward travel at station A, the structural details of which are shown in Figs. 3 and 5. This station comprises essentially, scraper plates 8 and 9, of any desired material, disposed in offset relation at the opposite faces of the web of gel film and extending the full width of the web. Each scraper plate is beveled at one edge at an angle of about 30° with the top face of the plate to form a film-contacting scraper blade of a sharpness insufficient to sever the gel film but sufficient to permit of clean scraping action with a minimum of frictional resistance between the blade and gel film. Each scraper blade is set at an angle to the gel film to form troughs 10 and 11 between the plates and film, in which are contained pools of water fed by headers 12 and 13 respectively, substantially coextensive in length with the scraper plates, and each provided with a plurality of water outlet openings. The film of fresh water picked up by the gel film at station A is substantially removed, together with impurities, from the gel film in its downward travel at station B. Station B comprises scraper plates 14 and 15 substantially identical with scraper plates 8 and 9, and water headers 16 and 17 disposed below plates 14 and 15 respectively, and provided with a plurality of wide angle spray nozzles 18 and 19 spaced to give an overlapping spray pattern as shown in Fig. 6. Wash water scraped from the film at station B gathers in the troughs formed at the back of plates 14 and 15 and is carried off for disposal by any suitable means (not shown). Stations C and E are substantial duplicates of station A and stations D and G are substantial duplicates of station B, it being understood that the number of stations may be increased or decreased as desired depending upon the degree of washing required, time factors, etc. The final wash water is removed at H by two additional scraper plates 20 and 21, and the film is thereafter conditioned in the conventional manner.

Each plate scraper of the foregoing arrangement is set at an angle and ranging from a minimum of 105° to a maximum of 120° with the surface being scraped. When the plates are set at a larger angle, the pool formed between the film and the plate on the upward washing is deeper and is apt to wrinkle the film. When they are set at a smaller angle, the pool of water is not of sufficient depth to give good application to the film. To insure efficient scraping action the two plates of each station should be vertically aligned so as to overlap between 1/8" and 1/4".

The distance between the scraper plates of a given station is determined principally by mechanical practicality. There is no real maximum distance; however, efficiency does drop as distance increases, therefore, approximately 2" may be taken as the maximum distance from operating and efficiency standpoint and 1" as the minimum.

To prevent or inhibit edge folds i. e. the tendency of the film to fold back upon itself at the running edges, the blade of the scraper plate which touches the surface of the film which does not contact the roll preceding the scraper should contact the gel film within a distance of not more than 8", and preferably within a distance of 6", measured from the center line of the roll. The minimum distance is that which is practical from a design standpoint.

Spacings between the washing stations must be related to time and machine speed. The minimum distance should be such that applied wash water remains in contact with the film at least ½ second before being removed and may be expressed by the following formula:

$$MD = S \times F$$

where $MD$ = minimum distance
$S$ = film speed in yards per minute $\times 0.915$.
$F$ = value between .0083 and 0.0274

The maximum distance is limited only by the fact that not more than 10% of the applied wash water should be removed between washing stations by intervening rolls or by evaporation. Evaporation is not important when cold water is being used but may be quite important when hot water is being used in dry atmospheres. Since all soluble impurities within the film are subject to the slow process of diffusion which proceeds in accordance with Fick's law it is advantageous to remove quickly as much of the extractable portion as possible.

Film guide and advancing rolls with a smooth surface should not be used. Smooth rolls tend to squeeze off some of the applied water, causing it to run back down the film, producing edge folds. Moreover, such squeezing effect is harmful from a chemical efficiency standpoint. Water applied to the film must remain in contact with it for a definite period of time in order to allow proper mixing with and dilution of the surface solution. Whenever a smooth roll removes water from the film (unless it can be located just prior to washing station) the balance of wash water volume versus time of film contact is disturbed and washer efficiency drops. This drop will cause an increase in water consumption and/or machine space requirements. For these reasons it is preferred to use rolls having knobby treads. However, any other roll surface which does not wrinkle film and which will move washing liquids along with the film can be used in place of the preferred design.

The following examples further illustrate the principles and practice of this invention.

Gel regenerated cellulose film 0.0025-0.003" thickness, 60" wide, made from viscose in a standard casting machine at 65.6 yards per minute, after leaving the desulfuring tank containing hot dilute caustic solution, is washed in apparatus diagrammatically illustrated in Fig. 1. The stainless steel scraper plates of each station overlap approxiamtely ¼" and their scraping edges are approximately 1" from each other. The scraping edge of scraper plates 9 and 13 are spaced 6" from the center line of rolls 1 and 2 respectively (see Fig. 1). Rolls 1-7 are knobby surfaced. The upper (driven) rolls are 60" from the lower (freely rotatable) rolls (measured from center line to center line) and the horizontal distance between the rolls of each group is 8¾". The header or distributor pipes at stations A, C and E are provided with 48 holes 5/64" in diameter and spaced 1½" apart. The headers of stations B, D and G are provided with 16 standard 1/8" spray nozzles spaced 4½" apart. Wash water is applied at the rate of 2.4 gallons per minute per plate and is scraped off at various stations (i. e. after various times of wash water contact) with the results indicated below.

The performance of the washer is evaluated in terms of the alkalinity, calculated as sodium hydroxide, associated with the gel regenerated cellulose film before and after washing with water. Alkalinity is chosen for the basis of the evaluation, rather than an impurity of more basic importance, such as sulfur, because the alkalinity has been found to be a good average of the several impurities present and also because of the simplicity of the analysis of the film.

Examples of washing the film at various stations are shown below:

| Example | No. of Washes | Time of Wash Water Contact Between Stations, sec. | Total Wash Water Contact Time, sec. | Percent of Incoming Impurities Removed |
|---|---|---|---|---|
| 1 | 1 | 1.67 | 1.67 | 45.5 |
|   | 1 | 3.33 | 3.33 | 51.3 |
|   | 1 | 5.0 | 5.0 | 54.2 |
|   | 1 | 6.66 | 6.66 | 52.0 |
|   | 1 | 8.33 | 8.33 | 54.7 |
|   | 1 | 10.0 | 10.0 | 55.2 |
| 2 | 2 | 1.66 | 3.33 | 68.7 |
|   | 2 | 3.33 | 6.66 | 74.5 |
|   | 2 | 5.0 | 10.0 | 74.0 |
| 3 | 3 | 1.66 | 5.0 | 81.8 |
|   | 3 | 3.33 | 10.0 | 85.3 |
| 4 | 4 | 1.66 | 6.66 | 86.1 |
| 5 | 5 | 1.66 | 8.33 | 88.6 |
| 6 | 6 | 1.66 | 10.1 | 89.6 |

In Example 1 wash water is applied at station A and scraped off at various stations from B to H. In this way six values are obtained with a minimum washing time of 1⅔ seconds and a maximum of 10 seconds.

In Example 2 water is applied at station A and scraped off at B, fresh water applied at B, and a final scraping at C. This gives the "two wash" value with a washing time of 3⅓ seconds. By washing at A and D and scraping at D and H, a "two wash" value at 10 seconds is obtained.

Values for Examples 3, 4, 5 and 6 are obtained in the same manner, the "six wash" value in Example 6 being obtained by washing and scraping at all six stations and final scraping at H making six 1⅔ second washes.

Removal of 85% of impurities is the objective in good washing. From the above examples it can be seen that this goal is reached with only three washes and a total wash water time of 10 seconds. Four washes with a total wash water contact time of 6⅔ seconds, five washes with 8⅓ seconds, and six washes with 10 seconds better the goal.

By comparison, when gel regenerated cellulose film of the same thickness and under the same conditions of speed, concentration in the desulfuring tank, etc. is washed in two standard wash water tanks, only 83% of the impurities are removed after 23 seconds contact with wash water of the same temperature. 9.75 gallons of water per 100 square meters of film is the minimum required to attain 83% removal of impurities in standard wash water tanks, whereas a minimum of 7.6 gallons of water per 100 square meters is required in the washer of this invention for 85% removal of impurities.

In Table I, the effect of increasing wash water temperature upon removal of impurities is shown. It is readily seen that higher temperatures do not result in radically improved removal of impurities. Thus, since the extraction process predominates and is relatively independent of the wash water temperature, in contrast to temperature-dependent diffusion there appears to be no economic advantage in washing with hot water.

TABLE I

*Amount of washing vs. wash water temperature*

| Water Wash Temperature, °C. | Percent Removal of Incoming Impurities (NaOH) |
|---|---|
| 5 | 78.5 |
| 38 | 86 |
| 51 | 87.7 |
| 64 | 88 |
| 82 | 89 |

3 washes, 3⅓ seconds per wash
2.25 gallons per minute per plate
10 seconds total wash water contact time
Film speed—65.6 yards per minute The effect of the quantity of wash water used upon the removal of impurities is shown in Table II. It is seen that an increase in volume of water used per plate causes only a slight increase in impurities removed.

TABLE II

*Quantity of wash water vs. removal of impurities*

| Gallons Per Minute/Plate of Wash Water | Percent Removal of Impurities (NaOH) |
|---|---|
| 1.33 | 86.5 |
| 1.83 | 88.4 |
| 2.25 | 91.4 |

6 washes, 1.66 seconds per plate; 10 seconds, total wash time.
Film speed—65.6 yards per minute.

Indications are that the tank type of washer heretofore used cannot be used much above speeds of 110 yards per minute, because bath drag due to frictional contact of the film with the wash water becomes excessive and produces film tension sufficiently high to seriously degrade the physical properties of the film. The increase in drag with increase in film speed is shown in Table III and is compared with the drag of the washer of this invention.

TABLE III

*Bath drag vs. film speed*

| Film Speed, Yards per minute | Pounds Drag of 60" Wide Sheet | |
|---|---|---|
|  | Standard Wash Tank | Present Washer |
| 21.9 | 1.7 | 3.9 |
| 43.8 | 3.5 | 4.0 |
| 65.6 | 5.5 | 4.1 |
| 87.5 | 8.9 | 4.25 |
| 109.3 | 14 | 4.45 |
| 131.2 | 22.5 | 4.7 |
| 153.1 | 36 | 4.9 |
| 175.0 | 58 | 5.2 |
| 196.8 | 91 | 5.6 |

From the above it is quite evident that the washer and washing process of this invention has a tremendous advantage over the conventional tank washing at high speeds. In addition the present invention is characterized by advantages of economy. For example, wash water temperature in a standard tank washer is somewhat critical, it being necessary to use warm water to obtain satisfactory washing. In the present washer, however, temperature is not important. Thus a saving in water heating cost results from the practice of this invention. Then too, the equipment required to wash film in accordance with the principles of this invention is much more compact than conventional tank washing equipment so that an important saving in costly space is also effected.

As many widely different embodiments can obviously be made without departing from the spirit and scope of our invention, it is understood that said invention is not to be restricted except as defined in the appended claims.

We claim:

1. A process for washing impurities from a traveling web of gel regenerated cellulose containing water soluble impurities and traveling at the rate of at least 110 yards per minute in a substantially vertical path which comprises coating the web of gel regenerated cellulose film on both sides with a film of fresh wash water sufficiently thin to avoid imposing substantial tension on said gel film due to liquid drag, maintaining said film of fresh water in contact with the gel film for a period of time sufficient to permit diffusion of impurities from the gel film to the wash water, and thereafter scraping the film of contaminated wash water from said gel film and repeating the sequence of coating with fresh wash water and scraping of the film of contaminated wash water until the desired degree of gel film purity is attained.

2. A process for washing impurities from a continuous web of gel regenerated cellulose film which comprises passing a web of gel regenerated cellulose film containing water soluble impurities at a speed of at least 110 yards per minute in alternating ascending and descending paths of travel, coating each face of said gel film with a film of fresh wash water by contacting each face of said gel film at a predetermined point in the ascending path of said gel film with a pool of fresh wash water sufficient in quantity to form on said film a coating of wash water but insufficient in quantity to impose substantial bath drag on said gel film, and scraping contaminated surface liquid from each face of said gel film, and thereafter coating each face of said gel film with a film of fresh water by spraying each face of said gel film with fresh wash water at a predetermined point in its descending path of travel.

HARRY McALPINE.
HERMAN FREDERICK HOERIG.

REFERENCES CITED

The following references are of record in the file of this patent:

UNITED STATES PATENTS

| Number | Name | Date |
| --- | --- | --- |
| 242,045 | Reilly | May 24, 1881 |
| 828,773 | Pease | Aug. 14, 1906 |
| 1,398,043 | Rau | Nov. 22, 1921 |
| 1,669,394 | Ellis | May 8, 1928 |
| 1,811,689 | Hands | June 23, 1931 |
| 1,858,437 | Dufford | May 17, 1932 |
| 1,933,084 | Allison | Oct. 31, 1933 |